United States Patent [19]
Gangsaas et al.

[11] Patent Number: 4,821,981
[45] Date of Patent: Apr. 18, 1989

[54] MANEUVER ENCHANCEMENT AND GUST ALLEVIATION SYSTEM

[75] Inventors: Dagfinn Gangsaas, Bellevue; Daniel C. Norman, Renton, both of Wash.

[73] Assignee: The Boeing Company, Seattle, Wash.

[21] Appl. No.: 147,066

[22] Filed: Jan. 25, 1988

Related U.S. Application Data

[63] Continuation of Ser. No. 785,389, Oct. 8, 1985, abandoned.

[51] Int. Cl.$^4$ .............................................. B64C 13/16
[52] U.S. Cl. .................................... 244/76 C; 244/191
[58] Field of Search ................ 244/75 R, 75 A, 76 C, 244/76 R, 191, 181, 182, 175; 364/433, 434, 427, 428, 449; 340/966–970, 963

[56] References Cited

U.S. PATENT DOCUMENTS

| | | | |
|---|---|---|---|
| 2,985,409 | 5/1961 | Atwood et al. | 244/76 C |
| 3,154,266 | 10/1964 | Sheppard et al. | 244/191 |
| 3,240,447 | 3/1966 | Olhausen | 244/191 |
| 3,330,503 | 7/1967 | Love et al. | 244/191 |
| 3,734,432 | 5/1973 | Low | 244/191 |

Primary Examiner—Galen Barefoot
Attorney, Agent, or Firm—Seed and Berry

[57] ABSTRACT

This invention provides a system for enhancing the performance of an aircraft during flight. The aircraft, which includes at least two control surfaces, such as stabilon and trailing edge flaps, includes devices for: generating a signal representative of the optimum normal acceleration from signals representative of the aircraft's flight status, generating a signal representative of the aircraft's actual normal acceleration, comparing the optimum signal to the actual signal, and generating a command to alter the position of either one or both of the aircraft's control surfaces to reduce any differences between the optimum and actual normal acceleration signals.

12 Claims, 4 Drawing Sheets

| LOAD FACTOR | CASE | STABILON LOOP | | | TRAILING EDGE LOOP | | LEADING EDGE LOOP | |
|---|---|---|---|---|---|---|---|---|
| | | PHASE MARGIN | GAIN MARGIN | GAIN MARGIN | GAIN MARGIN | GAIN MARGIN | GAIN MARGIN | GAIN MARGIN |
| −1.0g | EXISTING CAS (KAD −.82) | 44° @ 6.5 r/s | — | 5.4 dB @ 15 r/s | NA | NA | NA | NA |
| | FIXED CAS (KAD −.40) | 35° @ 3.7 r/s | — | 11.7 dB @ 15 r/s | NA | NA | NA | NA |
| | ME/GA | 43° @ 4.4 r/s | −7.0 dB @ 1.9 r/s | 17.3 dB @ 41 r/s | 10.6 dB @ 1.5 r/s | 17.5 dB @ 30 r/s | — | — |
| 1.0g | EXISTING CAS (KAD −.82) | 44° @ 6.5 r/s | — | 5.5 dB @ 15 r/s | NA | NA | NA | NA |
| | FIXED CAS (KAD −.40) | 35° @ 3.7 r/s | — | 11.7 dB @ 15 r/s | NA | NA | NA | NA |
| | ME/GA | 45° @ 4.5 r/s | −8.5 dB @ 1.8 r/s | 17.4 dB @ 41 r/s | 12.6 dB @ 1.4 r/s | 18.8 dB @ 30 r/s | — | — |
| 2.0g | EXISTING CAS (KAD −.82) | 44° @ 6.4 r/s | — | 5.5 dB @ 15 r/s | NA | NA | NA | NA |
| | FIXED CAS (KAD −.40) | 34° @ 3.6 r/s | — | 11.8 dB @ 15 r/s | NA | NA | NA | NA |
| | ME/GA | 48° @ 4.5 r/s | −10.3 dB @ 1.7 r/s | 17.3 dB @ 42 r/s | 14.0 dB @ 1.1 r/s | 18.1 d3 @ 30 r/s | — | — |
| 2.5g | EXISTING CAS (KAD −.82) | 46° @ 6.6 r/s | — | 5.5 dB @ 15 r/s | NA | NA | NA | NA |
| | FIXED CAS (KAD −.40) | 41° @ 3.8 r/s | — | 11.7 dB @ 15 r/s | NA | NA | NA | NA |
| | ME/GA | 60° @ 5.2 r/s | — | 17.2 dB @ 42 r/s | 17.8 dB @ 0.6 r/s | 17.7 dB @ 29 r/s | — | — |

NOTE: ALL LOOPS BROKEN AT ACTUATOR INPUTS
PHASE MARGIN IN TRAILING AND LEADING EDGE LOOPS IS ±180° FOR ALL CONDITIONS

| LOAD FACTOR | CASE | NORMAL ACCELERATION ||||| STABILON || TRAILING EDGE || LEADING EDGE ||
| | | AT CG (G) | AT COCKPIT ||| DEFLECTION (DEG) | RATE (DEG/SEC) | DEFLECTION (DEG) | RATE (DEG/SEC) | DEFLECTION (DEG) | RATE (DEG/SEC) |
| | | | (G) | REDUCTION FROM OPEN LOOP (PERCENT) | REDUCTION FROM EXISTING CAS (PERCENT) | | | | | | |
|---|---|---|---|---|---|---|---|---|---|---|---|
| -1.0g | OPEN LOOP | .0675 | .0616 | — | — | — | — | — | — | — | — |
| | EXISTING CAS | .0572 | .0510 | 17 | — | .194 | 2.10 | — | — | — | — |
| | ME/GA | .0510 | .0371 | 40 | 27 | .328 | 3.12 | .326 | 1.44 | .039 | .555 |
| 1.0g | OPEN LOOP | .0644 | .0589 | — | — | — | — | — | — | — | — |
| | EXISTING CAS | .0547 | .0491 | 17 | — | .182 | 1.97 | — | — | — | — |
| | ME/GA | .0496 | .0358 | 39 | 27 | .302 | 2.93 | .308 | 1.35 | .037 | .516 |
| 2.0g | OPEN LOOP | .0604 | .0563 | — | — | — | — | — | — | — | — |
| | EXISTING CAS | .0516 | .0469 | 17 | — | .164 | 1.81 | — | — | — | — |
| | ME/GA | .0464 | .0337 | 40 | 28 | .275 | 2.73 | .291 | 1.25 | .034 | .480 |
| 2.5g | OPEN LOOP | .0529 | .0439 | — | — | — | — | — | — | — | — |
| | EXISTING CAS | .0439 | .0396 | 10 | — | .172 | 1.51 | — | — | — | — |
| | ME/GA | .0410 | .0283 | 35 | 29 | .200 | 2.22 | .212 | .927 | .025 | .371 |

MANEUVER ENCHANCEMENT AND GUST ALLEVIATION SYSTEM

STATEMENT OF GOVERNMENT INTEREST

This invention was made with Government support under Contract No. F33615-78-C-3027 awarded by the U.S. Air Force. The Government has certain rights in this invention.

This application is a continuation of U.S. patent application Ser. No. 785,389, filed Oct. 8, 1985, now abandoned under C.F.R. §1.62.

BACKGROUND OF THE INVENTION

The present invention relates to a system for enhancing the flight performance of an aircraft and, more particularly, to such a system that enhances the pitch axis maneuverability of the aircraft, as well as alleviates gust induced normal acceleration.

In recent years aircraft have been equiped with automatic flight control devices to assist the pilot's control of the aircraft. Such devices include computer assisted closed-loop maneuver enhancement systems and gust alleviation systems, such as shown in U.S. Pat. Nos. 3,841,912 and 2,745,613.

These previous systems have not been able to adequately solve a particular problem of using adversely coupled control surfaces. What is meant by this is that a horizontal stabilizer or stabilon causes a change of pitch of an aircraft in flight. Yet often times, the use of another control surface, such as a trailing edge flap, causes a change in lift as well as a downward change in pitch. Using the stabilon and a variable camber wing together requires careful coordination because of the effective coupling between the trailing edge flap and the stabilon. Significant adverse lift is generated by the stabilon and the trailing edge flap that has a destabilizing effect on pitching movement. Further, the lift generated by the trailing edge is significantly reduced by the stabilon. If the trailing edge is used to produce a significant improvement in the normal acceleration (Nz) response, it needs to be carefully balanced with the stabilon's use. Otherwise, if the stabilon is used improperly to counteract the adverse pitching movement of the trailing edge flap, the aircraft will become highly unstable.

One prior art device to provide gust alleviation that uses two control surfaces is described in U.S. Pat. Nos. 3,215,374 and 3,240,447. The systems described are for use primarily with a canard equiped aircraft and utilizes a computer to read the normal acceleration, angular rate of pitch change, and control surfaces position to generate a signal representative of the angle-of-attack increment caused by a gust. Then, the control surfaces are adjusted to counteract the normal accelaration due to the gust. A problem with the above described system is that it is really only capable of gust alleviation. Certain aircraft are now equiped with variable camber wings, i.e. wings with trailing edge and/or leading edge flaps, which need to be coordinated with the stabilon for maneuver enchancment. Nowhere is it disclosed or suggested in the two patents mentioned above to provide a system that provides both maneuver enhancement and gust alleviation. Further, the inventors hereof know of no other system that generates a signal representative of the optimum normal acceleration of the aircraft continuously while in flight and then always tries to match the actual normal acceleration with the synthesized optimum signal.

SUMMARY OF THE INVENTION

The present invention provides a system for enhancing the flight performance of an aircraft that overcomes the above described deficiencies. On an aircraft having at least two control surfaces, such as a stabilon and trailing edge flaps, devices and/or computers are provided for:

(a) generating a signal representative of the optimum normal acceleration (Nz) from signals representative of the aircraft's flight status, (b) generating a signal representative of the aircraft's actual normal acceleration (Nz), (c) comparing the optimum normal acceleration signal to the actual normal acceleration signal, and (d) generating a command to alter the position of two or more of the control surfaces to reduce any differences between the optimum normal acceleration signal and the actual normal acceleration signal.

The use of the present invention provides significantly improved aircraft normal acceleration response to pilot commands while simultaneously reducing cockpit normal acceleration response to turbulence. One embodiment of the present invention is designed to integrate these two functions such that the performance of each function is in no way degraded by the use of the other function, i.e. the problems of adverse coupling of control surfaces are significantly reduced.

The advantages and objects of the invention will become evident from the following detailed description of the drawings when read in connection with the accompanying drawings which illustrate preferred embodiments of the invention.

BRIEF DESCRIPTION OF THE DRAWINGS

FIG. 2 is a table of ME/GA mode frequency response results.

FIG. 4 is a table of ME/GA mode gust alleviation results.

DETAILED DESCRIPTION OF THE DRAWINGS

The present invention is a system to enhance the flight performance of an aircraft, such as by maneuver enhancement and gust alleviation. In broadest terms, the system includes devices and/or computers for the following functions: generating a signal representative of the optimum normal acceleration from signals representative of the aircraft's flight status, generating a signal representative of the actual normal acceleration, comparing the optimum normal acceleration signal to the actual normal acceleration signal, and generating a command to alter the position of either one or more control surfaces any difference between these signals.

Figure 1:
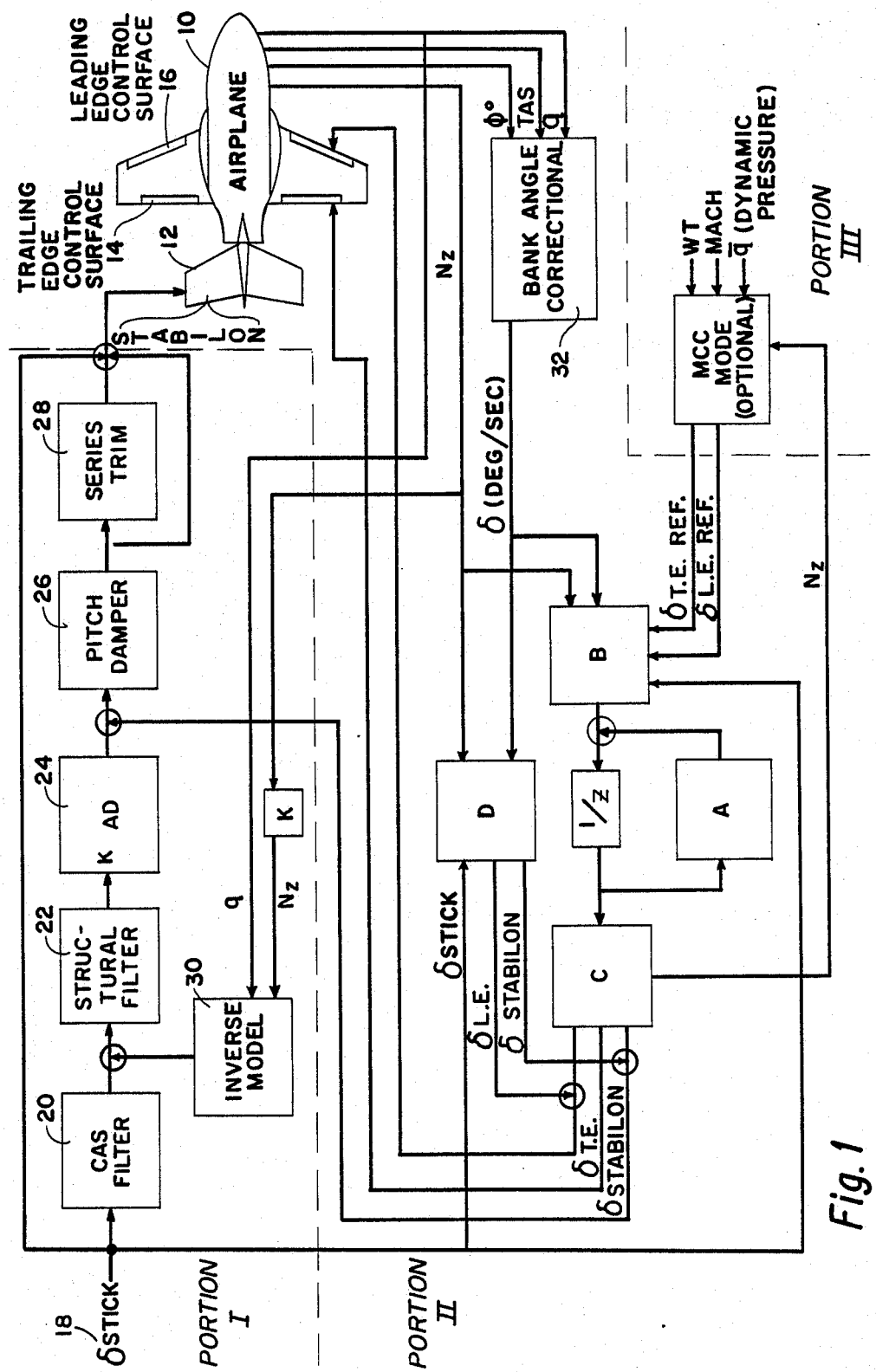
FIG. 1 is a functional block diagram of one embodiment of the present invention.

For a better understanding of the present invention, reference will be made to FIG. 1, where subdivided portion I represents an existing aircraft augmentation control system, portion II represents the system of the present invention, and portion III represents an optional maneuver camber control system. The present invention can also be used alone as the aircraft's main flight augmentation system.

Reference numeral 10 represents an aircraft that is equiped with a system of the present invention. The aircraft 10, as shown, is equiped with a stabilon 12, a variable camber wing having either both a trailing edge flap 14 and a leading edge flap 16 or just one. Also, the aircraft 10 can be of any configuration, i.e. conventional or delta wing with or without canards. However, the primary purpose of the present invention is to enhance the flight performance of an aircraft that has at least two control surfaces, which can be adversly coupled (as described earlier).

If the present invention is used along with the aircraft's existing flight augmentation control system, then very minor modifications to that system need to be made, as will be described. Portion I of FIG. 1 diagramatically represents any conventional control system, but includes an input from the pilot's stick 18 to a control augmentation system (CAS) filter 20, a structural filter 22, and an adaptive gain 24, which for the purposes of this embodiment has a fixed gain. Pitch signals pass through a pitch damper 26 and a series turn 28 to the stabilon 12.

Inside and along the exterior of the aircraft 10, sensors are provided for indicating the aircraft's status, such as bank angle ($\phi°$), true airspeed (TAS ft/sec), pitch rate (q rad/sec or deg/sec), and normal acceleration (Nz G) measured at the cockpit. Such sensors can be analog or digital, as desired. The normal acceleration (Nz) signal and the pitch rate (q) signals are passed to an inverse model 30, within the existing flight augmentation control system (Portion I).

In the present invention, the bank angle ($\phi°$), true airspeed (TAS) and pitch rate (q) signals are passed into a bank angle corrector 32 that corrects the pitch rate (q) signal for any bank induced error. The corrected pitch rate (q) signal and the normal acceleration (Nz) signal are then passed to a matrix complex represented by blocks A, B, C and D. The matrix complex was designed by using linear quadric Gaussian regulator theory to generate a full state gain matrix and a Kalman state estimator. Subsequent reduction in the order of the compensator made implementation practical. The application of optimal control theory in the matrix complex furnishes direct synthesis of the aircraft and gains. Further, it has been found to be well suited for integrating several control tasks and accommodating conflicting requirements for highly coupled multi-loop problems.

The matrix complex is designed to accept continuous signals of the aircraft's states or status while in flight and then using the difference equations (1/Z) generate an idealized or optimum acceleration value or signal. The plurality of difference equations generate commands to one or more of the aircrafts control surfaces to continuously cause the normal acceleration of the aircraft to approach or meet the idealized or optimum normal acceleration. In other words, the aircraft for all flight positions will try to track the optimum acceleration thereby increasing the aircraft's maneuverability and simultaneously providing gust alleviation.

The matrix complex contains a control law which is formed from a plurality of difference equations in the form of:

$$y(K) = Cx(K) + Du(K)$$

$$x(K+1) = Ax(K) + Bu(K)$$

where x and y are the coordinates of the matrices, the K's indicate the transition in time of the states, and x also represents the state or status value and u is an input value. A, B, C and D represent the four matrices. Block 1/Z represents in block diagrams form the difference equations themselves.

In one embodiment of the present invention, the linear quadratic Gaussian process begins with the design of a linear regulator, which requires knowledge of all aircraft states, most of which cannot be measured directly. Therefore, a Kalman filter is used to estimate such states using a pitch rate signal and normal acceleration signal. As shown in FIG. 1, the pitch rate (q) and normal acceleration (Nz) are fed as inputs into matrix D, which provides direct command of the pilot's stick to the control surface, and into matrix B. The referenced position of the variable camber wing, comprising a leading edge flap 16 and/or the trailing edge flap 14, are also inputs into the matrix B. The control surface references positions can be provided by control commands or through an optional manuever camber control (Position III in FIG. 1). The system state or status signals that go into matrix B pass through the difference equations (Block 1/Z) in a loop through matrix A and finally to matrix C. The output of matrix C when summed with the output of matrix D consists of position commands for the stabilon, leading edge flap and/or trailing edge flap. These signals are passed to the respective devices (not shown) on the aircraft 10 to cause one or more of the control surface's position to be adjusted to bring the senced normal acceleration (Nz) of the aircraft 10 as close to as possible the generated optimum normal acceleration (Nz).

In one embodiment of the present invention, there are 11 system states or statuses, that are the variable in the matrix A, B, C or D that change in flight. These 11 states are as follows:

1, 2: estimated short period of aircraft
3, 4: estimated trailing edge flap surface $\Delta$ rate and position
5: idealized Nz response
6: integral of $\Delta$ = ideal Nz − sensed Nz
7: integral of $\Delta$ = commanded leading edge position and referenced leading edge position
8: integral of $\Delta$ = commanded trailing edge position and referenced trailing edge position
9: CAS filter 20 (Portion I of FIG. 1)
10: roll-off filter for stabilon command
11: roll-off filter for variable camber control surface (s) command In the present invention, gust alleviation is accomplished by the quadratic cost penalty on normal acceleration (Nz). Maneuver enhancement is incorporated by describing an ideal or optimum model for the maneuver and then reducing the difference between the sensed normal acceleration of the aircraft and the optimum normal acceleration by solving the equation in the matrix complex. Thus with a stick command to the aircraft and the optimum model, the aircraft will attempt to track the ideal/optimum model. This results in a maneuver enhancement function operation that includes the gust alleviation mode. Both maneuver enhancement or the gust alleviation modes operate independently or concurrently and in the absence of a pitch stick input the system operates solely as a gust alleviation system. This design approach provides optimal closed-loop response with respect to release from initial flight conditions and random input disturbances that have a flat power spectrum over the range of frequencies characteristics of the airplane. Because air turbulence has a power spectrum that is not flat over the range of frequencies, a Dryden turbulence model driven by white voice can be used to augment the synthesis model, as is well known.

The devices used to generate the optimum normal acceleration signals on a continuous basis from solving the difference equations, to compare the actual to the optimum normal acceleration signals, and to generate the surface command signals are analog or, preferably programable digital computer. These computers can be stand alone or part of the aircraft's existing flight computer.

The present invention provides a system where two or more control surfaces can be controlled effectively to improve the flight performance of the aircraft. Specifically, by using the difference equations through the matrix complex A, B, C and D command signals are generated so that the control surfaces are correctly and optimally coordinated to prevent any unnecessary structural frequency excitation which could result in aircraft wing or structure failure. In other words, the system provides high gain at low frequencies and a low gain at high structural frequencies, even though the gains of the system matrices fixed. Further, the ideal model generated by the matrix complex is a first order lag with a break frequency tuned to provide a good response without excessive overshoot.

The present invention was tested for stability margins, gust alleviation performance and time response characteristics. The frequency response analysis was used to evaluate the control sensitivity to modeling variations and uncertainties. The frequency response was computed by separately breaking each control loop into separate sections. The sample frequency response results for a Mach 0.6, 15,000 ft. flight condition for different load factors are shown in FIG. 2. The present invention labeled ME/GA, is seen to meet good stability margins of ±6 dB and 45° for all tested load factors. The ME/GA mode is also seen to have better stability margins than the existing aircraft flight control (CAS) at all load factors except −1 g, where the phase margin is 43°.

Figure 3:
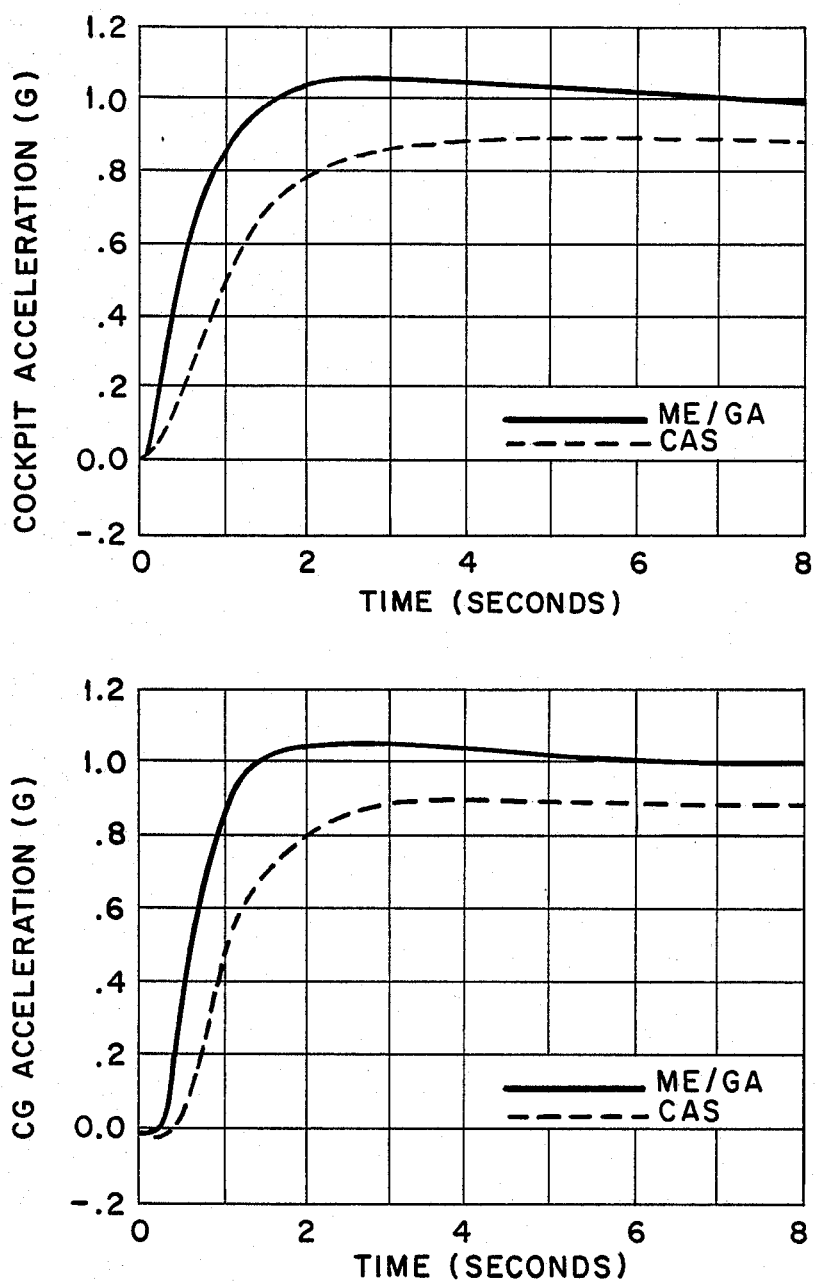
FIG. 3 is a graph of ME/GA mode normal frequency (Nz) response results.

The command response was evaluated for the ME/GA with a pilot stick command to produce an incremental load factor of 1 g. A 0.3 sec linear ramp input was used to simulate the pilot input. The cockpit and cg acceleration response characteristics for the Mach 7, 3000 ft. flight condition are shown in FIG. 3. The ME/GA mode is seen to exhibit a much quicker response than the existing CAS. Similar results are true at other flight conditions.

Gust alleviation performance was evaluated by comparing the rms vertical gust response of the open loop airplane, closed loop airplane with an existing CAS and a closed loop airplane with ME/GA. The ME/GA mode reduces the gust response by 20%-34% over the existing CAS as shown in FIG. 4.

Overall, the benefits of the ME/GA mode is reduced drag, increased fuel efficiency, additional manueverability, improved handling and improved ride quality.

Whereas the present invention has been described in particular relation to the drawings attached hereto, other and further modifications apart from those shown or suggested herein, may be made within the spirit of the present invention.

Changes may be made in the construction and arrangement of the parts or elements of the embodiments as described herein without departing from the spirit or scope of the invention defined in the following claims.

What is claimed is:

1. A system for providing precise normal acceleration maneuver response of an aircraft based on input commands while simultaneously reducing any deviations from a precise commanded normal acceleration response due to gusts, the aircraft having a flight status and at least two control surfaces that produce pitching moments and lift and which may be adversely coupled, the control surfaces being responsive to control surface commands that are functions of the input commands and the gusts, the control surface commands being integrated such that for all frequencies of response the response to gusts does not oppose the response to the input commands and the response to the input commands does not oppose the response to the gusts, comprising:
    (a) means for generating a signal representative of a derived commanded normal acceleration ($Nz_c$) of the aircraft from the input commands;
    (b) means for generating a signal representative of the actual normal acceleration response (Nz) of the aircraft;
    (c) means for taking the difference between the derived commanded normal acceleration signals to the actual aircraft normal acceleration signals; and
    (d) means for generating the control surface commands to alter the positions of two or more of the control surfaces to reduce any differences between the derived commanded normal acceleration signals and the actual aircraft normal acceleration signals in response to the differences, between the desired normal acceleration of the aircraft and the actual normal acceleration and other input signals representative of the aircraft flight status, regardless of the frequency of response of the desired commanded normal acceleration and the frequency of response of the actual aircraft normal acceleration due to the gusts.

2. The system of claim 1 wherein at least two control surfaces comprise a stabilon and a trailing edge flap, which are adversely coupled.

3. The system of claim 2 wherein the aircraft further includes a leading edge flap controlled by ($\delta$).

4. The system of claim 1 wherein the measured signals representative of the aircraft's flight status comprise normal acceleration at the cockpit (Nz), corrected pitch rate (q'), pilot's stick position ($\delta_{stick}$), reference trailing edge flap command ($\delta_{T.E.REF.}$) and reference leading edge flap command ($\delta_{L.E.REF.}$).

5. The system of claim 4 and including means for eliminating any bank induced error in the pitch rate signal.

6. The system of claim 1 wherein (d) includes Kalman filter means to estimate nondirectly measured aircraft flight status signals and a linear quadratic regulator to alter the positions of the control surfaces.

7. The system of claim 1 comprising a programmable digital computer.

8. The system of claim 7 wherein the programmable digital computer performs matrix computations utilizing a plurality of matrices formed from fixed gain coefficients and the measured signals representative of aircraft status signals to compute the commands to alter the positions of the two or more control surfaces.

9. The system of claim 8 wherein the plurality of matrices are formed from the fixed gain coefficients by a linear quadratic Gaussian regulator.

10. The system of claim 1 wherein the input commands are produced by a transducer on a stick controlled by a pilot of the aircraft.

11. The system of claim 1 wherein the input commands are produced by a computer system.

12. A method of providing precise normal acceleration maneuver response of an aircraft based on input commands while simultaneously reducing any deviations from a precise commanded normal acceleration response due to gusts, the aircraft having a flight status and at least two control surfaces that produce pitching moments and lift and which may be adversely coupled, the control surfaces being responsive to control surface commands that are functions of the input commands and the gusts, the control surface commands being integrated such that for all frequencies of response the response to gusts does not oppose the response to the input commands and the response to the input commands does not oppose the response to the gusts, comprising the steps of:

(a) generating a signal representative of a derived commanded normal acceleration ($Nz_c$) of the aircraft from the input commands;

(b) generating a signal representative of the actual normal acceleration response ($Nz$) of the aircraft;

(c) taking the difference between the derived commanded normal acceleration signals to the actual aircraft normal acceleration signals; and (d) generating the control surface commands to alter the positions of two or more of the control surfaces to reduce any differences between the derived commanded normal acceleration signals and the actual aircraft normal acceleration signals in response to the differences, between the desired normal acceleration of the aircraft and the actual normal acceleration and other input signals representative of the aircraft flight status, regardless of the frequency of response of the desired commanded normal acceleration and the frequency of response of the actual aircraft normal acceleration due to the gusts.

* * * * *

UNITED STATES PATENT AND TRADEMARK OFFICE
CERTIFICATE OF CORRECTION

PATENT NO. : 4,821,981
DATED : April 18, 1989
INVENTOR(S) : Dagfinn Gangsaas et al.

It is certified that error appears in the above-identified patent and that said Letters Patent is hereby corrected as shown below:

In the title, delete "ENCHANCEMENT" and substitute therefor --ENHANCEMENT--.

In claim 3, column 6, line 46 delete "($\delta$)" and substitute therefor --(d)--.

Signed and Sealed this

Twelfth Day of December, 1989

*Attest:*

JEFFREY M. SAMUELS

*Attesting Officer*     *Acting Commissioner of Patents and Trademarks*